United States Patent
Murphy

[19]

[11] Patent Number: 5,806,622

[45] Date of Patent: Sep. 15, 1998

[54] LIGHTWEIGHT VEHICLE WITH PIVOTAL CANOPY

[75] Inventor: Mark E. Murphy, Eugene, Oreg.

[73] Assignee: Nev Corporation, Eugene, Oreg.

[21] Appl. No.: 637,294

[22] Filed: Apr. 24, 1996

[51] Int. Cl.$^6$ .............................. B60J 5/02; B60K 1/00; B62D 1/12; B62D 61/06

[52] U.S. Cl. ..................... 180/210; 180/65.1; 180/908; 280/778; 280/95.1; 280/781; 296/146.8; 296/216

[58] Field of Search ................................. 180/210, 214, 180/216, 217, 908, 65.1; 280/778, 95.1, 781, 796, 798; 296/146.8, 216

[56] References Cited

U.S. PATENT DOCUMENTS

| D. 94,847 | 3/1935 | Martin . | |
|---|---|---|---|
| D. 188,718 | 8/1960 | Laher . | |
| D. 200,703 | 3/1965 | Thomas et al. . | |
| D. 263,391 | 3/1982 | Pivar . | |
| D. 320,958 | 10/1991 | Kimura et al. . | |
| 2,656,214 | 10/1953 | Alamagny . | |
| 2,777,728 | 1/1957 | Barenyi | 296/216 |
| 2,822,214 | 2/1958 | Rivolta . | |
| 3,542,417 | 11/1970 | Mohs . | |
| 3,664,450 | 5/1972 | Udden et al. | 180/65.1 |
| 3,666,035 | 5/1972 | Dudouyt | 180/210 |
| 4,573,546 | 3/1986 | Irimajiri et al. . | |
| 4,671,563 | 6/1987 | Shakespear . | |
| 5,343,973 | 9/1994 | Lanker | 280/781 |

FOREIGN PATENT DOCUMENTS

| 77676 | 6/1954 | Denmark . | |
|---|---|---|---|
| 872026 | 5/1942 | France | 296/216 |
| 2 240 629 | 4/1975 | France . | |
| 2522606 | 9/1983 | France | 280/778 |
| 204904 | 8/1959 | Germany | 180/210 |
| 494865 | 7/1955 | Italy | 296/146.8 |
| 2-109727 | 4/1990 | Japan | 180/908 |
| 210698 | 10/1940 | Switzerland | 180/210 |
| 1525-070-A | 11/1989 | U.S.S.R. . | |

OTHER PUBLICATIONS

HPV News—Official Newsletter of the International Human Powered Vehicle Association, vol. 10, No. 2, Mar./Apr. 1993.

*Primary Examiner*—Peter C. English
*Attorney, Agent, or Firm*—Klarquist Sparkman Campbell Leigh & Whinston, LLP

[57] ABSTRACT

An electric vehicle includes a chassis supported by three wheels. A seat is carried by the chassis, and the seat is enclosed in a compartment formed by a pivotable canopy. A pair of push-pull steering levers are positioned laterally of the seat to avoid obstructing forward access to the seat. There is an open space through the floor of the vehicle in front of the seat, which allows the occupant to enter and exit from the seat without climbing up into the vehicle. The canopy has a nose portion with a footrest panel that is inclined inwardly toward the occupant in the seat. This arrangement permits the vehicle to be used even by persons with limited mobility, who may have difficulty entering and leaving other vehicles.

30 Claims, 5 Drawing Sheets

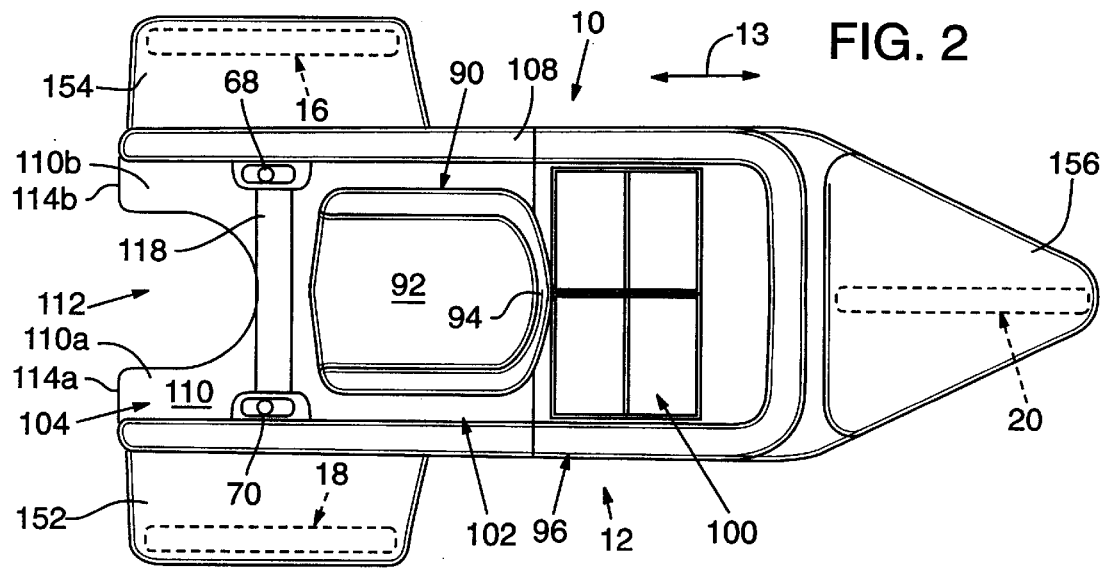
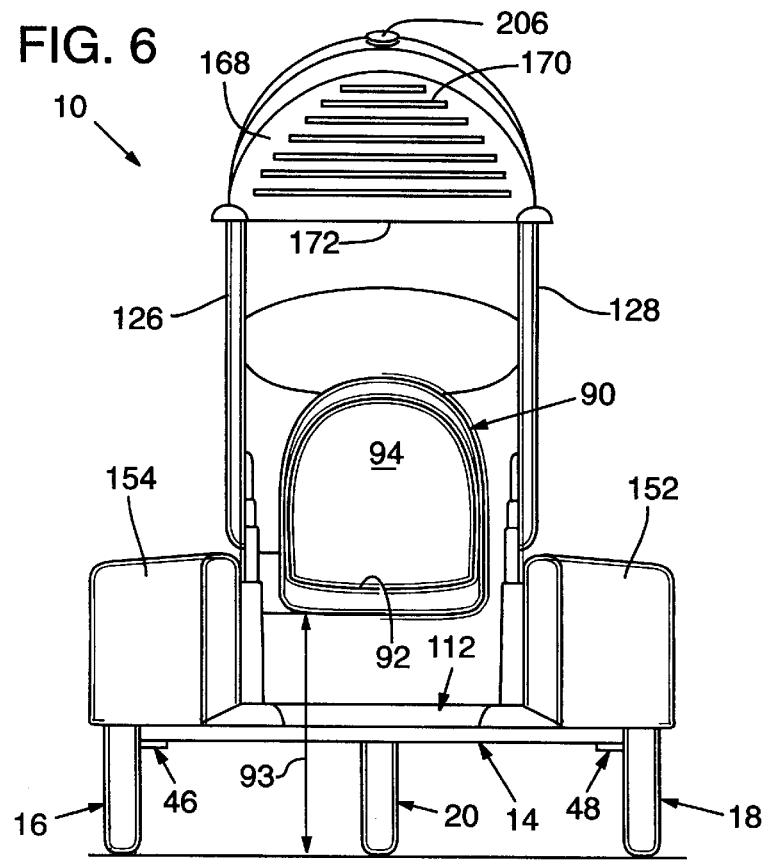

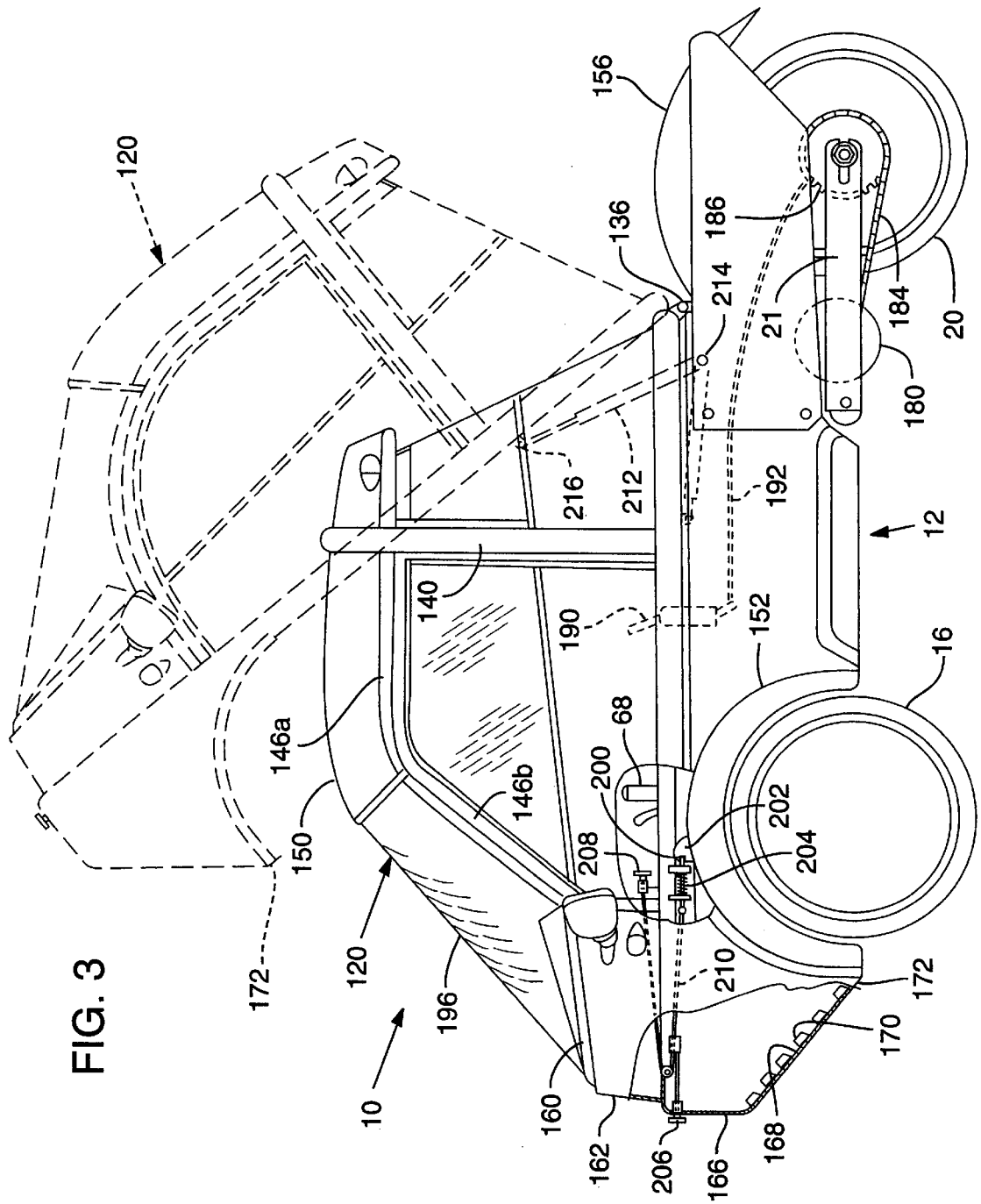

LIGHTWEIGHT VEHICLE WITH PIVOTAL CANOPY

BACKGROUND OF THE INVENTION

1. Field of the Invention

This invention concerns a lightweight vehicle, particularly a three-wheeled electric vehicle suitable for transporting a single passenger.

2. General Discussion of the Background

There has been a strong demand in recent years for small, lightweight vehicles that are economical to operate, relatively pollution-free, and suitable for use by a broad variety of individuals. A particular class of such vehicles is known as a neighborhood electric vehicle (or NEV), which is designed to transport an occupant around a residential or recreational area. Such vehicles are particularly suitable for use in suburban areas, on golf courses, or in retirement communities. An NEV should ideally be lightweight, simple to use, and suitable for persons with limited physical mobility.

There are many previous examples of small or relatively lightweight vehicles that have been used for transporting one or more individuals. An example of such a conveyance is shown in U.S. Pat. No. 4,573,546, which discloses a three-wheeled motor vehicle having a tapering, aerodynamically styled monocoque construction body that encloses a driver's compartment, and holds a seat for one person. A gull wing side door provides access to the driver's compartment, and a steering wheel is positioned in a fixed position in front of the driver's seat. The low profile of the vehicle, however, makes it difficult for the driver to disembark through the gull wing side door of the vehicle. Disembarking from the vehicle would be a particular problem for an older or physically handicapped person.

U.S. Pat. No. 4,671,563 also shows a small, lightweight automotive vehicle having a side opening door. A pivotal chair is mounted on a vertical pivot axis, to allow the chair to rotate toward the opening in the side of the vehicle. This pivotal chair helps avoid the necessity of the occupant twisting the body to disembark from the side door. The necessity for a pivotal axis nonetheless increases the mechanical complexity and weight of the vehicle, which is a drawback for lightweight compact vehicles.

In other lightweight automotive vehicles, entry into and exit from the vehicle may be permitted by a movable top or canopy, or a front or rear door that is pivotally connected to the vehicle for movement about a generally horizontal or skewed axis. An example of such a vehicle is U.S. Pat. No. 3,542,417, in which a rear door of the vehicle pivots upwardly, around a hinge forward of the seat, to permit rearward entry into the vehicle. Although this configuration permits a passenger to enter the vehicle without turning, the more difficult task of rising from the seat must be coordinated with rotation of the body to leave the vehicle through the rear door.

French Patent No. 2,240,629 shows a motor vehicle having a front door hinged on a horizontal axis to swing upwardly and away from the front of the vehicle. Although it is possible to enter and exit this vehicle through the open front, this forward pathway of entrance or exit is at least partially obstructed by the steering wheel in front of the seat. Moreover, an occupant of the vehicle must climb over a front bumper when entering and exiting the vehicle. This maneuver is often difficult for an elderly or debilitated person, and is inconvenient and uncomfortable for others.

Soviet Union Patent 1525-070 discloses a chassis in which a vehicle top may be pivotally attached to a flat floorboard, at both the front and rear of the floorboard. Other vehicles having pivotal front sections that open the vehicle include U.S. Pat. No. 2,656,214, U.S. Pat. No. 2,822,214 and Danish Patent (DK) No. 77676. A variety of other three-wheeled vehicles are shown in Design U.S. Pat. Nos. 94,847; 188,718; 200,703; 263,391; and 320,958. All of these design patents show vehicles that require a driver or passenger to embark or disembark through a side door, which could be awkward, difficult or impossible for some individuals. Even for agile individuals, the body design is not ergonomic or convenient.

It is accordingly an object of this invention to provide an ergonomically designed, lightweight vehicle that is suitable for a broad variety of individuals, even including persons having orthopaedic disabilities that make it difficult for them to exit from a side or rear door.

Another object of the invention is to provide such a vehicle that is convenient, compact, relatively inexpensive, and capable of straightforward assembly.

Finally, it is an object of the invention to provide such a vehicle that is convenient and economical for any person to use.

SUMMARY OF THE INVENTION

The foregoing objects are achieved by providing a lightweight vehicle having a seat carried by a chassis that is supported by a plurality of wheels. A covering over the chassis forms a passenger compartment or canopy. At least part of this canopy moves between a closed position and an open position. When the canopy is in the closed position, the covering obstructs the forward path of entry or exit in front of the seat. When the covering or canopy is in the open position, the covering does not obstruct the forward path.

The vehicle preferably has an open space in front of the seat, through which the feet of a passenger sitting in the seat can be placed (with the legs in partial flexion) to help the occupant easily move between a sitting and standing position. A steering member (such as a steering post) is disposed in a position lateral to the seat for steering the vehicle while the handle is in the lateral position, such that position of the steering handle is not obstructing a forward path in front of the seat.

In a more particular embodiment, the vehicle is an electric vehicle that includes a chassis having a front axle and a rear axle, and the seat is carried by the chassis within a passenger compartment between the axles. A front opening is provided through the floor of the vehicle in front of the seat, and the opening is sufficiently large for a vehicle occupant to place the feet in to prepare for standing. A steering handle post is fixed in a position lateral to the seat, and preferably includes a pair of interlinked push-pull steering posts. A canopy covers the passenger compartment and pivots between a closed position (in which the canopy extends in front of the seat and obstructs a forward path of entrance and exit) and an open position (in which the canopy is lifted above the seat and the forward path is not obstructed).

The canopy includes a forward nose portion that obstructs the forward path when the canopy is in the closed position, and the nose portion provides an inwardly inclined footrest in front of the foot opening. The position of the footrest is preferably at a location in which the feet of an occupant can rest comfortably on the footrest when the occupant is sitting in the seat, with the thighs flexed at the hips, the lower legs only slightly flexed, and the feet in a position of mild plantarflexion. This comfortable position is similar to that assumed by the body when in a conventional recliner chair with the feet comfortably elevated on the recliner footrest.

In a more particular embodiment, the electric vehicle includes a chassis extending in a longitudinal direction, with two wheels on the front axle and a single wheel on the rear axle. A seat is carried by the chassis, with the horizontal support member of the seat at about the normal height above ground as found in a typical chair. A foot opening is provided through the floor of the vehicle, in front of the seat, for the vehicle occupant to stand in when entering and exiting the vehicle. The steering handle is fixed in a position lateral to the seat, and a canopy covers the passenger compartment and pivots between the closed and open positions. The nose portion of the canopy is inclined inwardly to form a footrest in front of the foot opening when the canopy is in the closed position.

This arrangement allows the vehicle occupant to embark and disembark from the compartment, with the canopy in the raised position, in a manner analogous to sitting in and rising from a conventional chair. The feet can be placed on the ground (through the foot opening) to support the body in a comfortable position relative to the seat while sitting or standing up. Once the canopy is lowered, the feet can then be lifted out of the opening and placed comfortably on the footrest while the vehicle is in motion.

A better understanding of the invention can be had by reference to the following drawings and detailed description, which is provided for purposes of illustration.

BRIEF DESCRIPTION OF THE DRAWINGS

FIG. 2 is a top view of the vehicle of FIG. 1 in which the canopy has been removed to reveal the floor module.

FIG. 3 is a side view of the vehicle similar to that shown in FIG. 1, wherein the canopy in the raised position is shown in phantom.

FIG. 6 is a front view of the vehicle of FIG. 1, with the canopy shown in the open position.

DETAILED DESCRIPTION OF A PREFERRED EMBODIMENT

Figure 1:
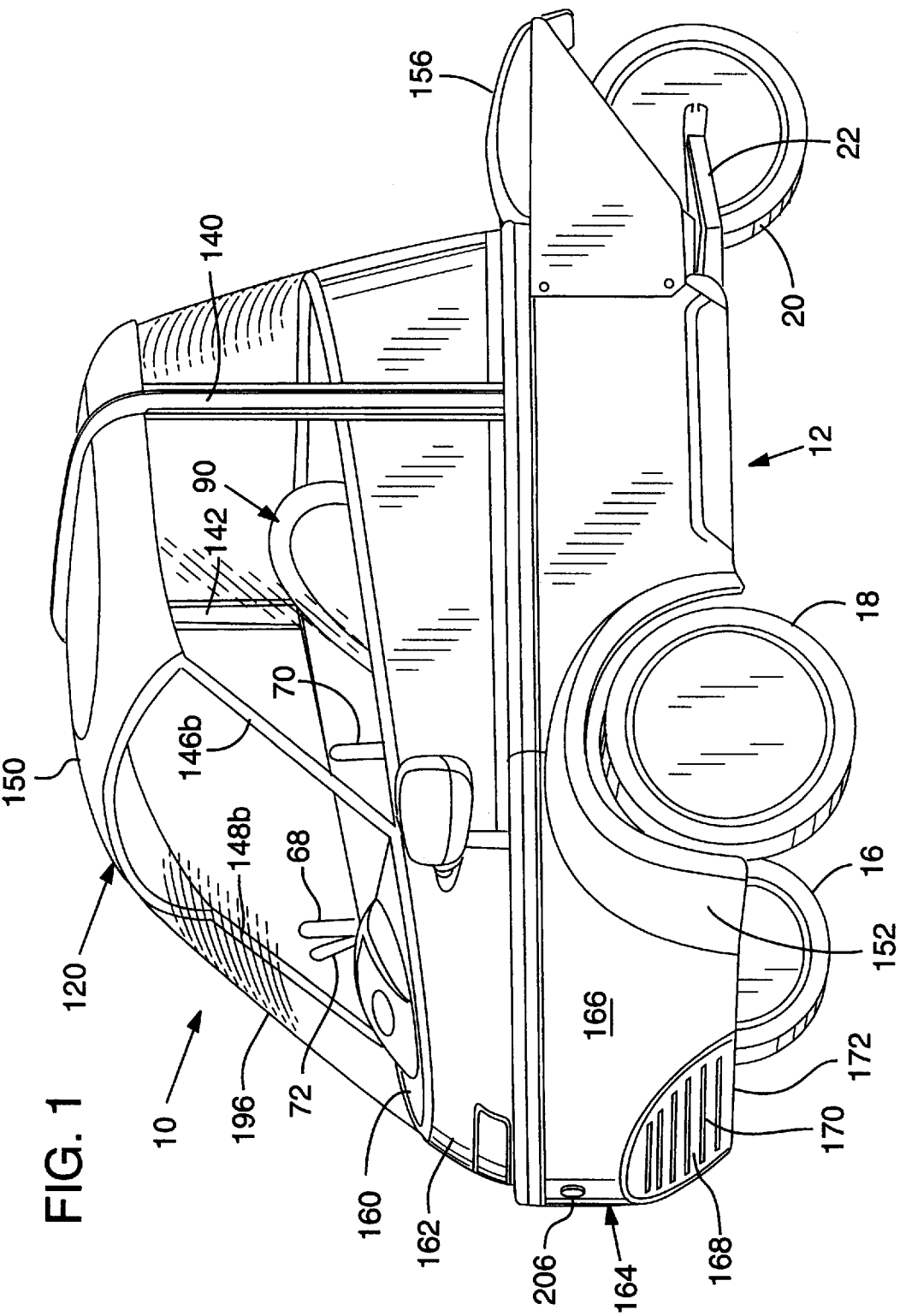
FIG. 1 is a front perspective view of the neighborhood electric vehicle of the present invention, with the canopy in the closed position.

An electric vehicle 10 (FIG. 1) is shown in the drawings to include an elongated chassis 12 (FIG. 2) extending in a longitudinal direction 13, and having a front transverse axle 14 (FIG. 4) with two wheels 16, 18 pivotally attached to axle 14. Chassis 12 also includes a rear wheel 20 at a rear end of the vehicle, supported by a transverse rear wheel support frame 21 having a two arm suspension 22 extending toward rear wheel 20 and suspending it for free rotation therebetween.

Chassis 12 has a generally U-shaped chassis frame (FIG. 4) that includes a spaced, parallel pair of side members 26, 28 with a rear cross bar 30 extending transversely between side members 26, 28. A curved front axle supporting strut member 32,34 extends downwardly in an arcuate path from the front of each side member 26, 28. Similarly, a rear wheel supporting strut 36 extends down from rear cross bar 30 of the chassis frame 24. Front axle 14 is suspended from struts 32, 34 by parallel double suspension arms 38, 40 extending rearwardly from struts 32, 34 toward front axle 14, parallel to side members 26, 28.

Figure 4:
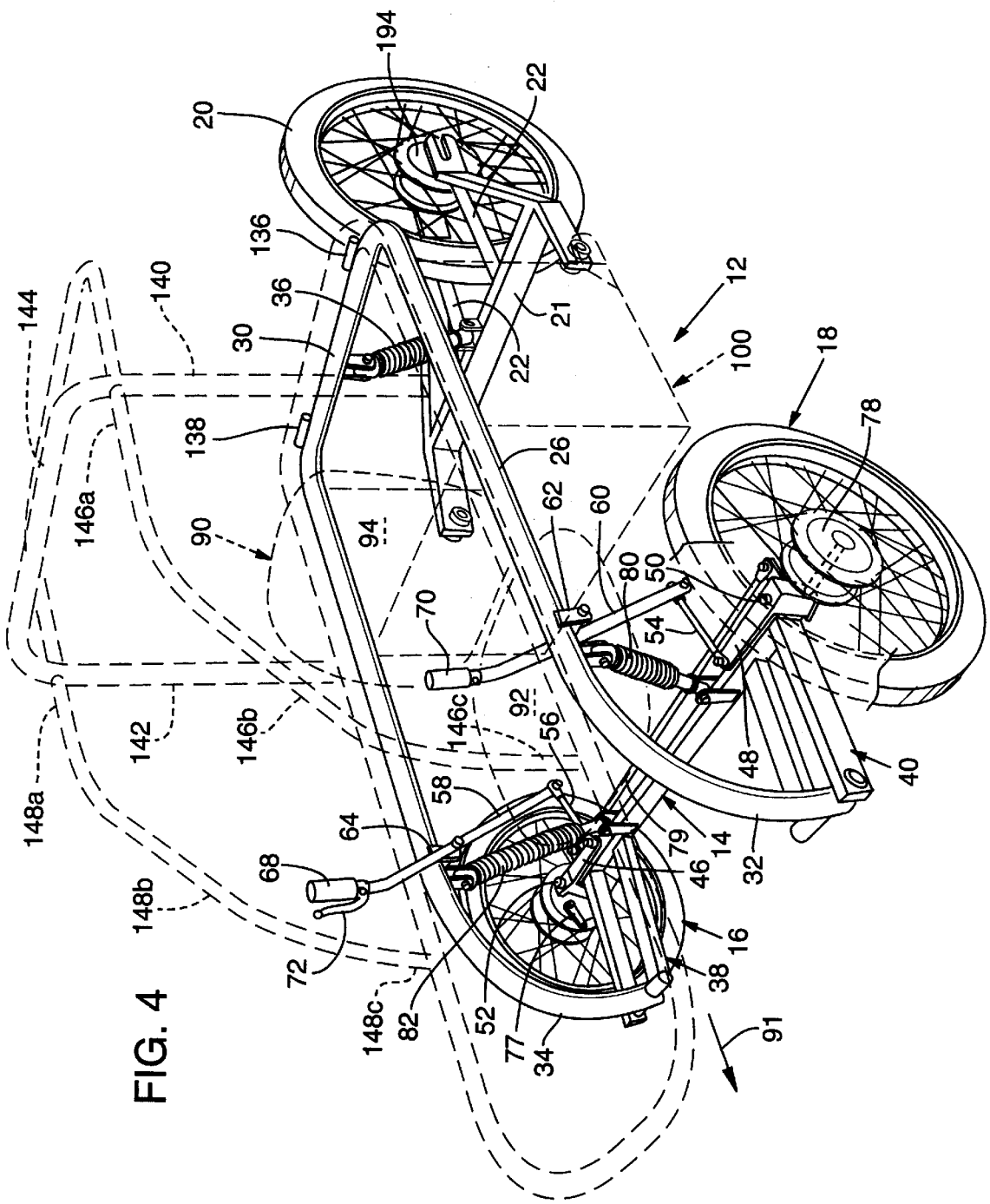
FIG. 4 is a view of the chassis frame, with the canopy frame shown in phantom.

Each of wheels 16, 18 is pivotally mounted on front axle 14 by a steering control spindle 46, 48 (FIG. 5) that pivots about a pivot pin 50, 52 (FIG. 4). Each spindle 46, 48 is pivoted by a linkage arm 54, 56 that is in turn connected to a steering lever or post 58, 60. The steering levers are angled slightly forwardly, and extend in a generally vertical direction upwardly and inwardly of chassis frame side members 26, 28. An intermediate portion of the levers 58, 60 is pivotally mounted at pivot brace 62, 64 to side members 26, 28, respectively. Each steering lever 58, 60 is capped with a cylindrical handle grip 68, 70. Handle grip 68 is stationary, and is provided with an adjacent handle grip brake lever 72 which activates a conventional cable brake 74 (FIG. 5) that splits into brake cables 75, 76. The cables 75, 76 lead respectively to brakes 77, 78 on each of the front wheels 16, 18.

A tie rod 79 (FIG. 4) extends between the steering spindles 46, 48 so that pivotal movement of one spindle is transmitted to the other spindle. Tie rod 79 provides a linkage between the movement of the two wheels 16, 18 so that they move in tandem as the vehicle is being steered. This linkage also allows the occupant to use the two levers 58, 60 in a push-pull manner to steer the vehicle.

Handle grip 70 is a rotatable throttle grip which signals an electric motor 180 (FIGS. 3 and 5) to vary the speed of the motor that provides propulsion for vehicle 10. Alternatively, the handle grip 70 may be a squeeze grip or other hand actuated member. The throttle grip varies the speed at which vehicle 10 travels, by communicating a signal to a controller (not shown) that regulates the amount of power from a battery to the motor.

Coil spring shock absorbers 80, extend between a location on side members 26, 28 near pivot braces 62, 64, downwardly to front axle 14 at a position immediately inward of steering control spindles 46, 48. Rear strut 36 is similarly provided with a coil spring shock absorber that cushions the impact of surface terrain variations transmitted to vehicle 10.

A single occupant seat 90 (FIGS. 4 and 5) is carried by chassis 12, and is fixed in a forward position such that the occupant of the seat faces in the direction 91 (FIG. 4) that vehicle 10 travels. Seat 90 includes a substantially horizontal seat support 92, and an upright backrest 94 extending transversely across vehicle 10, substantially completely filling the area between side members 26, 28. Seat 90 is preferably fixed in the forward position shown in the drawings, and does not pivot around a vertical axis to face either side of vehicle 10. The illustrated embodiment shows a single occupant seat that holds one person, such that the vehicle is designed for transporting only one individual (the driver who controls the vehicle). Other embodiments are possible in which multiple occupants can be accommodated in the vehicle, by providing more seat space and foot room. It is a particular advantage of the disclosed single occupant embodiment, however, that it is quite compact and lightweight.

A floor member 96 (FIGS. 2 and 5) is configured to fit on and within chassis frame 24, and includes a storage module 100, a seat module 102, and a front floor module 104. A support bar 106 (FIG. 5) extends across chassis 12 between side members 26, 28, and fits in a narrow space between storage module 100 and seat module 102 to help support the floor member 96. A peripheral lip 108 extends around the top edge of floor member 96 to provide a peripheral support flange that helps suspend member 96 from side members 26, 28 and rear cross bar 30 of chassis 12.

Floor module 104 (FIGS. 2 and 5) extends forwardly of seat module 102, and provides a floor 110 having an elongated cutaway portion with an arcuate inner edge that forms a foot opening 112 in floor 110. Opening 112 is of sufficient size to permit an occupant of the vehicle to stand in the opening, and preferably has dimensions of approximately 18 inches wide×12 inches long (along the longitudinal axis of the vehicle). The foot opening in the disclosed embodiment is formed inwardly from the front edges 114*a*, 114*b* of floor module 104, but not completely transversely across the floor module, thereby leaving flat side boards 110*a*, 110*b* on either side of the opening. Foot opening 112 extends longitudinally rearwardly from the front of the vehicle up to a transverse ridge 118 that separates floor module 104 from seat module 102.

Figure 5:
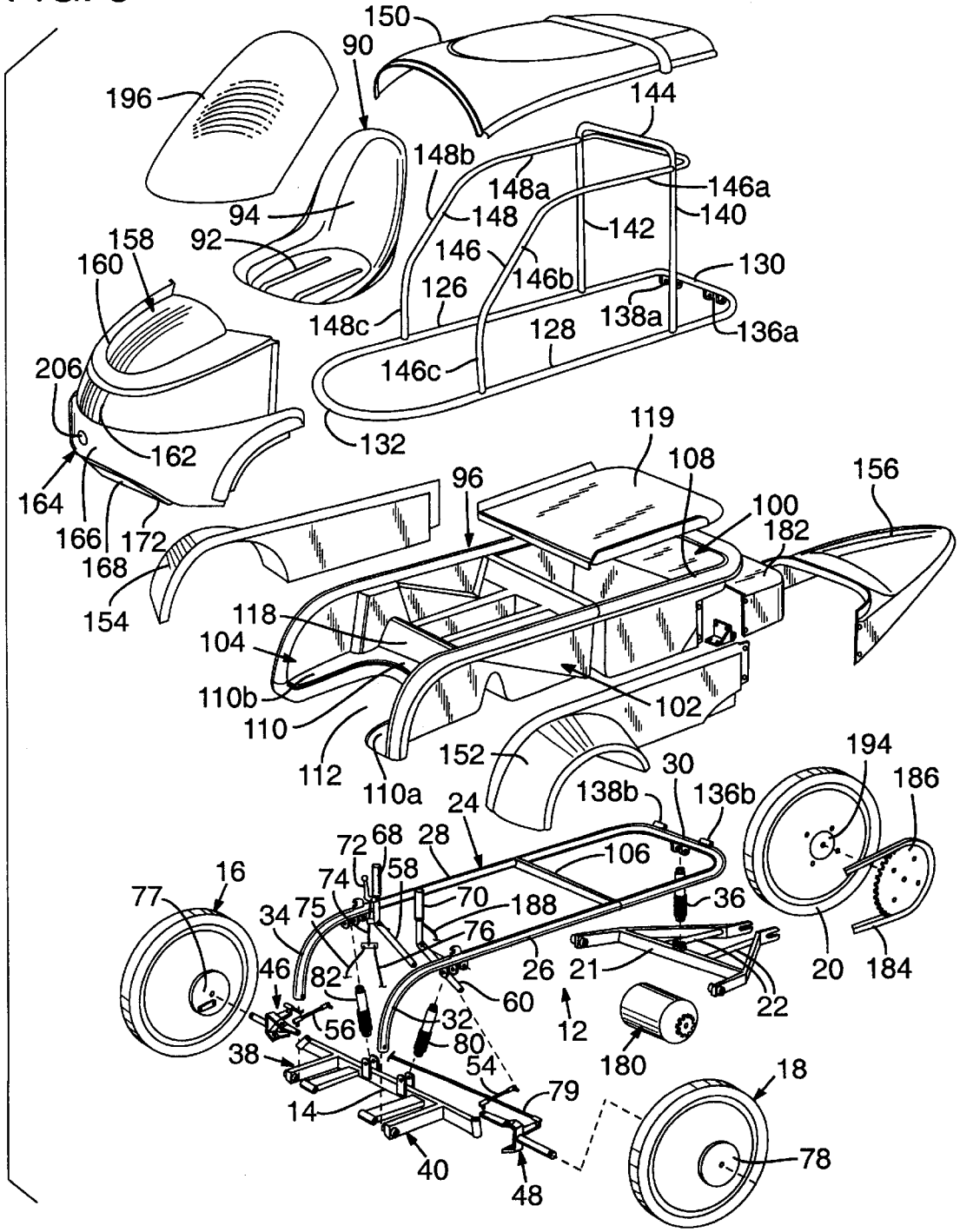
FIG. 5 is an exploded view of the chassis frame of the vehicle shown in FIG. 3, showing the canopy frame, body panels, steering system, and drive system.

Storage module 100 defines a battery storage box, which is provided with a cover 119 (FIG. 5). A battery charger is also carried by the vehicle (for example in the storage module 100) so that the battery can be charged by plugging an electrical cord from the vehicle into an outlet.

Seat module 102 forms a support surface on which horizontal seat member 92 is placed. Seat member 92 is preferably held in module 102 at a height above the ground that is substantially the same as the height above the ground of a conventional chair. In the disclosed embodiment, the seat member 92 is supported at a height 93 (FIG. 6) of approximately 15 to 18 inches above the surface on which vehicle 10 rides.

A pivotal canopy 120 (FIGS. 1 and 3) selectively covers an occupant compartment of vehicle 10. Canopy 120 pivots between a closed position (shown in solid lines in FIG. 3) and an open position (shown in FIG. 6, as well as in phantom lines in FIG. 3). The canopy is formed on a canopy frame (FIGS. 4 and 5) that has two longitudinally extending, transversely spaced parallel side members 126, 128. A rear cross bar 130 extends transversely between side members 126, 128 at the rear of the canopy frame, while an arcuate front cross bar 132 extends transversely across the front of canopy 120. A roof frame is mounted to and extends upwardly from side members 126, 128 to support a roof panel, and define window openings.

Rear cross bar 130 is pivotally connected at hinges 136, 138 (FIG. 4) to the chassis frame to permit the canopy to be moved between the closed position and the open position. The hinge axis of hinges 136, 138 is substantially perpendicular to the longitudinal axis of vehicle 10, such that the canopy rotates upwardly to a position over seat 90 without rotating sidewardly. Hinges 136, 138 include leaves 136*a*, 138*a* (FIG. 5) into which knuckles 136*b*, 138*b* are interdigitated, and a hinge pin is placed. In the disclosed embodiment, the hinges 136, 138 about which the canopy rotates are behind the seat 90, above the level of seat support 92. This elevated position of the hinges has been found to allow the canopy to be relatively lightweight, and easily opened by a vehicle occupant.

Front cross bar 132 is an arcuate member that projects transversely across the width of vehicle 10 forwardly of seat 90 and seat module 102, as well as forwardly of floor module 104. In the disclosed embodiment, cross bar 132 is located at the forwardmost portion of a nose section 158 described below. Cross bar 132 preferably extends transverse to the vehicle's direction of travel, but above seat support 92 at about the same level as hinges 136, 138.

The roof frame includes two parallel, upright roof support members 140, 142 (FIGS. 4 and 5), that are interconnected at their tops by a transverse roof cross brace 144. Two parallel, substantially identical frame members 146, 148 extend between a top portion of members 140, 142 from rearwardly of brace 144 down to side members 126, 128. Each member 146, 148 includes segments 146*a*, 148*a* that are spaced from and substantially parallel to side members 126, 128; a forwardly inclining angle segment 146*b*, 148*b* that extends downwardly at an angle toward side members 126, 128; and downwardly extending, substantially vertical segments 146*c*, 148*c* that are connected perpendicularly to side members 126, 128.

Molded body panels (such as fiberglass, plastic or other polymer) are secured to the frame members to enclose the passenger compartment of vehicle 10. These panels include a roof panel 150 (FIGS. 1 and 5) that is fixed to and supported by the roof frame, side fender panels 152, 154 that are secured to member 96, a rear cover panel 156, and a nose shell 158 that is carried by and pivots upwardly with front cross bar 132 of the canopy frame.

Nose shell 158 (FIG. 5) is an integral, fiberglass piece that has a substantially parabolically shaped top surface 160 that is progressively downwardly sloped in the direction of the front of the vehicle. A skirt 162 extends downwardly from surface 160 to form an arcuate front skirt 162. Depending from skirt 162 is a footrest shell 164 that includes a curved bumper 166 that surrounds and supports an inwardly inclined footrest panel 168. The footrest panel extends substantially completely across the distance between chassis members 26, 28, at about a 45° angle to the front of shell 164 and the surface on which vehicle 10 rides (when the canopy is in the closed position). An interior face of footrest panel 168 is preferably coated with an antiskid material, and also has a plurality of transverse anti-skid footrest ridges 170 (FIG. 1).

The transverse lower lip 172 (FIG. 1) of nose shell 158 defines the front edge of foot opening 112 when the canopy is in the closed position. The lower lip 172 is preferably elevated several feet above the top of seat back 94 when the canopy is raised. The height of lower lip 172 in the raised canopy is sufficiently high that the head of the occupant will clear lip 172 as the occupant leans forward and stands.

A variable speed electric motor 180 (FIGS. 3 and 5) is mounted in a motor compartment 182 behind storage module 100. Motor 180 is connected by a drive chain 184 to drive sprocket 186 that turns rear wheel 20. The speed of electric motor 180 is varied by turning throttle 70 to move a control wire in throttle cable 188 (FIG. 5). A conventional controller (not shown) receives signals from the throttle to regulate the amount of power from the battery to the motor.

A parking brake lever 190 (FIG. 3) is provided in the canopy compartment within reach of seat 90. Lever 190 is connected to a brake cable 192 that leads to a brake 194 (FIG. 4) on rear wheel 20.

A front windshield 196 (FIG. 5) is mounted to the canopy frame between roof panel 150 and nose shell 158. Side and rear windows may be mounted in the appropriate openings of the roof frame, or transparent flexible fabric or thermoplastic material (such as diaphanous cloth or clear plastic sheets) may selectively be placed in the side and rear window openings.

The vehicle includes a latch mechanism for selectively securing the canopy in a closed position. The latch mechanism includes a spring biased locking pin 200 (FIG. 3) that is biased into a locking member 202. Pin 200 may be pulled against the bias of a spring 204 to disengage pin 200 from member 202 to unlatch the canopy and allow it to be raised to the open position. The pin can be pulled against the bias of spring 204 either by pulling a front latch 206 or an interior latch 208 that is connected to the pin 200 by a cable 210.

A hydraulic lift assist assembly 212 (only one of which is shown in FIG. 3) is provided between chassis 12 and the canopy to help lift the canopy to the open position. Such an assembly is preferably provided on each side of the canopy, and is connected to the chassis at a pivot hinge 214 and to the canopy at a pivot hinge 216. The resistance provided by assemblies 212 also prevents the canopy from falling shut precipitously, which could be dangerous. Similarly, the hydraulic assemblies help the canopy shut in a smooth, controlled fashion.

In operation, the canopy is raised by pulling on exterior latch 206 to disengage locking pin 200. The canopy is then lifted up, by pivoting it around the axis of hinges 136, 138, to raise the canopy to the elevated position shown in phantom in FIG. 3. The occupant then approaches the seat 90, faces away from the seat, and sits down in it as in any other chair. The open area in front of seat 90 that is formed by foot opening 112 is an unobstructed region to which access is not impeded by a bumper or part of the chassis frame. One can simply walk up to the seat 90 and bend forward while flexing the legs and transferring body weight to the seat. With the occupant seated, the feet extend through foot opening 112 and may rest on or slightly above the ground level on which the vehicle rides.

Once the occupant is in place in the seat, the occupant reaches up to pull the canopy downwardly. The hydraulic assemblies 212 allow the canopy to move in a controlled fashion to the closed position shown in FIG. 1, at which time the pin 200 of the latch assembly engages the latch, and secures the canopy in the closed position. The occupant then lifts the feet out of the foot opening 112, and transfers them to the inclined footrest panel 168. The occupant now assumes an ergonomically compatible and comfortable position, much like the position assumed by the body in a recliner chair.

An ignition key (not shown) can then be used to start motor 180, and parking brake lever 190 is released to allow the vehicle to move in the direction 91 (FIG. 4). The speed of motor 180 can be varied by moving throttle handle grip 70, which in turn controls the speed at which rear wheel 20 is rotated to propel the vehicle. The occupant (who is also the driver) can brake the vehicle by squeezing handle grip lever 72 to engage brakes 77, 78.

The direction of travel of the vehicle is controlled by steering levers 58, 60. These levers are fixed in a position lateral to seat 90 so that they do not obstruct the front of the seat. The levers 58, 60 are interlinked by tie rod 79 so that the vehicle can be turned by pushing on one of the levers and pulling the other lever. This push pull relationship, in the lateral position, has been found to provide a comfortable and easily operated steering system.

When the vehicle has reached its destination, the occupant flexes the legs at the knee to remove the feet from the footrest panel 168 and place the feet through the foot opening 112. The occupant then pulls latch 208 to disengage the latching mechanism. Upward force applied by the occupant against the canopy lifts the canopy to the open position. The occupant is then able to rise to a standing position, with the trunk flexed at the waist, as in rising from a conventional chair. This truncal flexion is sufficient to avoid impact between the occupant's head and the canopy as the occupant rises and walks away. The body can then be straightened as the occupant walks away and clears the canopy.

The vehicle described herein is convenient and lightweight, as well as ergonomically compatible. The unobstructed access to the seat avoids the necessity of twisting the body in a seated position, and also permits entrance and egress without climbing over or down from a chassis member. The canopy is spaced above and rotates about a hinge axis above the floor of the vehicle, and preferably above the horizontal seat member, which reduces the canopy weight and enhances the convenience of lifting the canopy.

Having illustrated and described the principles of my invention with reference to one preferred embodiment, it should be apparent to those persons skilled in the art that such invention may be modified in arrangement and detail without departing from such principles. I claim as my invention all such modifications as come within the true spirit and scope of the following claims.

I claim:

1. A vehicle, comprising:
   a chassis supported by a plurality of wheels;
   a seat carried by the chassis;
   a steering member disposed in a position lateral to the seat for steering the vehicle with the steering member in the lateral position when the vehicle is being propelled, wherein the steering member steers at least one of the wheels, and the lateral position of the steering member does not obstruct a forward path of exit in front of the seat; and
   a covering over the chassis that forms a passenger compartment and footrest, wherein at least part of the covering moves between a closed position in which the covering and footrest obstructs the forward path of exit in front of the seat, and an open position in which the covering and footrest does not obstruct the forward path of exit in front of the seat.

2. A vehicle, comprising:
   a chassis supported by a plurality of wheels;
   a seat carried by the chassis;
   a steering member disposed in a position lateral to the seat for steering the vehicle with the steering member in the lateral position when the vehicle is being propelled, wherein the steering member steers at least one of the wheels, and the lateral position of the steering member does not obstruct a forward path of exit in front of the seat; and
   a covering over the chassis that forms a passenger compartment, wherein at least part of the covering moves between a closed position in which the covering obstructs the forward path of exit in front of the seat, and an open position in which the covering does not obstruct the forward path of exit in front of the seat; and
   wherein the vehicle has an open space in front of the seat when the covering is closed, through which open space the feet of a passenger sitting in the seat can be placed on a surface on which the vehicle rides.

3. The vehicle of claim 2 wherein the covering comprises a canopy that rests on the chassis in the closed position, and the canopy is pivotally attached to the chassis rearwardly of the seat, such that the canopy can pivot between the closed position and the open position.

4. The vehicle of claim 2 wherein the seat is fixed in a forward direction, with a backrest transverse to a longitudinal axis of the vehicle.

5. The vehicle of claim 2 wherein the steering member comprises a pair of handles, one on each side of the seat.

6. The vehicle of claim 5, wherein a hand brake is positioned on one of the handles and a hand throttle is positioned on the other of the handles.

7. A vehicle, comprising:
a chassis supported by a plurality of wheels;
a seat carried by the chassis;
a steering member disposed in a position lateral to the seat for steering the vehicle with the steering member in the lateral position when the vehicle is being propelled, wherein the steering member steers at least one of the wheels, and the lateral position of the steering member does not obstruct a forward path of exit in front of the seat; and
a covering over the chassis that forms a passenger compartment wherein at least part of the covering moves between a closed position in which the covering obstructs the forward path of exit in front of the seat, and an open position in which the covering does not obstruct the forward path of exit in front of the seat, wherein the covering comprises a shell with a front nose portion having an inwardly inclined foot rest portion on which the feet of a passenger seated in the seat can rest while the vehicle is in motion.

8. A vehicle, comprising:
a chassis having two front wheels on a front axle and at least one rear wheel;
a seat carried by the chassis within an occupant compartment;
a foot opening in front of the seat, wherein the opening is large enough for an occupant to stand in;
a steering member disposed laterally of the seat; and
a canopy that covers the occupant compartment, wherein at least a portion of the canopy pivots between a closed position in which a forward path of exit from the seat is obstructed, and an open position in which the forward path of exit is not obstructed.

9. The vehicle of claim 8, further comprising a footrest in the occupant compartment forward of the foot opening.

10. The vehicle of claim 9 wherein the canopy comprises a nose portion that obstructs the forward path of exit when the canopy is in the closed position, and an interior of the nose portion provides the footrest.

11. The vehicle of claim 10 wherein the foot opening is located between the front axle and the footrest.

12. The vehicle of claim 8, wherein the canopy is an integral shell that is pivotally attached to a transverse pivot axis, rearwardly of the seat.

13. The vehicle of claim 8, wherein the seat consists of a single seat fixed in a forward facing direction.

14. The vehicle of claim 8, wherein the seat is carried by the chassis between the front axle and the rear wheel.

15. The vehicle of claim 14, wherein the chassis includes a pair of fixed side members, one on each side of the seat, that obstruct a lateral path of exit from the seat.

16. The vehicle of claim 14, wherein the chassis comprises a generally U-shaped frame member having a pair of side members, a rear cross bar extending between the side members, a rear wheel supporting portion extending downwardly from the rear cross bar, and a front axle supporting portion extending downwardly from each side member, wherein one side member extends on each side of the seat.

17. The vehicle of claim 16, wherein the canopy comprises a canopy frame having two longitudinal side members, a rear cross bar, and a front cross bar, wherein the rear cross bar of the canopy frame is pivotally attached to the rear cross bar of the chassis, and the side members of the canopy frame rest on the side members of the chassis when the canopy is in the closed position.

18. The vehicle of claim 17, wherein the canopy further includes a roof frame spaced from the canopy frame side members.

19. An electric vehicle, comprising:
a chassis extending in a longitudinal direction, and including two wheels on a front axle, and a single rear wheel;
a seat carried by the chassis;
a foot opening, to an exterior of the vehicle, in front of the seat, wherein the opening is sufficiently large for a vehicle occupant to stand in;
a steering handle, fixed in a position lateral to the seat, wherein the position of the steering handle does not obstruct a forward path of exit from the seat in the longitudinal direction; and
a canopy that covers an occupant compartment, wherein at least a portion of the canopy pivots between a closed position that obstructs the forward path of exit, and an open position that does not obstruct the forward path of exit, and the canopy includes a nose portion that is inclined inwardly to form a footrest in front of the foot opening when the canopy is in the closed position.

20. The electric vehicle of claim 19, wherein the steering handle is one of first and second steering handles, one on each side of the seat, and the first and second steering handles are interconnected in a push-pull relationship.

21. A vehicle, comprising:
a chassis extending in a longitudinal direction, and having a front axle with two wheels at a front end, a rear wheel at a rear end, and a floor;
a seat carried by the chassis within an occupant compartment;
a foot opening through the floor in front of the seat, wherein the opening is sufficiently large for an occupant to stand in; and
a canopy that covers the occupant compartment, wherein at least a portion of the canopy pivots between a closed position in which a forward path of exit from the seat is obstructed, and an open position in which the forward path of exit is not obstructed.

22. The vehicle of claim 21 wherein the canopy further comprises a nose portion having an inclined surface that slopes inwardly in front of the foot opening to provide a footrest when the canopy is in the closed position.

23. A vehicle comprising:
a longitudinally extending chassis supported by a plurality of wheels;
a compartment for an occupant;
a seat in the compartment;
a canopy that pivots upwardly and downwardly between a closed position in which the canopy extends in front of the seat, and an open position in which the canopy is lifted above the seat;
a nose portion of the canopy that provides an inwardly inclined footrest portion of the canopy in front of the seat when the canopy is in the closed position, wherein the footrest portion of the canopy is raised above the seat when the canopy is in the open position.

24. The vehicle of claim 23, further comprising a foot opening to the exterior of the vehicle between the seat and the nose portion of the canopy.

25. The vehicle of claim 23, further comprising a steering member carried by the chassis and not the canopy.

26. The vehicle of claim 23, wherein the chassis further comprises fixed side panels on both sides of the seat that are not part of and are not moved by movement of the canopy between the closed and open positions.

27. The vehicle of claim 26, wherein the side panels are fiberglass panels.

28. An electric vehicle, comprising:

a chassis elongated in a longitudinal direction, and having a front transverse axle with two wheels pivotally attached at a front end, and a rear wheel at a rear end, wherein the chassis further comprises a generally U-shaped chassis frame that includes a pair of side members with a rear cross bar extending between the side members, an axle supporting member extending downwardly from each side member, and a rear wheel supporting member extending down from the rear cross bar of the chassis frame;

an occupant seat carried by the chassis in a fixed forward position, with a back support extending transversely to the chassis;

a chassis floor;

a canopy that covers an occupant compartment, and pivots between a closed position and an open position, wherein the canopy comprises a canopy frame having two longitudinal side members, a roof frame, a rear cross bar, and a front cross bar, wherein the rear cross bar of the canopy frame is hinged to the rear cross bar of the chassis frame to move the canopy between the closed position and the open position, and wherein the front cross bar extends forwardly of the seat to define a nose portion, and the nose portion includes a shell carried by the canopy frame, wherein the shell is inclined rearwardly to form a footrest spaced forwardly from the seat;

a foot opening in the chassis floor, between the footrest and seat, wherein the opening is of sufficient size to permit an occupant to stand in the foot opening;

a first steering handle fixed in a position lateral to a first side of the seat, and a second steering handle fixed in a position lateral to a second side of the seat, wherein the first and second steering handles are interconnected by a tie rod so that the first and second handles are in a push-pull relationship, and the steering handles turn the front wheels as the steering handles are pushed and pulled;

a hand brake mounted to the first steering handle, wherein the hand brake actuates a braking cable connected to a brake in each front wheel;

a throttle mounted to the second steering handle;

an electric motor carried by the chassis rearwardly of the seat, wherein the throttle varies the speed of the electric motor;

a drive member between the electric motor and the rear wheel for driving the rear wheel to propel the electric vehicle;

fixed side panels carried by the chassis that extend along the occupant seat at a height above the seat;

a roof panel carried by the roof frame; and a latch that selectively latches the canopy in the closed position, and a release member that selectively releases the latch to release the canopy from the closed position.

29. A vehicle having at least three wheels, and comprising:

a chassis;

a pivotal body on the chassis that defines an occupant compartment;

a seat in the occupant compartment for supporting an occupant;

wherein the pivotal body includes a footrest portion that pivots upwardly away from a front of the vehicle to allow the occupant to exit in a forward direction without obstruction from the footrest portion.

30. The vehicle of claim 29 wherein the chassis includes side structural members that do not pivot upwardly with the pivotal body.

* * * * *